US010532810B2

(12) United States Patent
Rauber et al.

(10) Patent No.: US 10,532,810 B2
(45) Date of Patent: Jan. 14, 2020

(54) ADJUSTABLE BLADE-TO-HUB LEAD-LAG DAMPER ATTACHMENT

(71) Applicant: BELL HELICOPTER TEXTRON INC., Fort Worth, TX (US)

(72) Inventors: Richard E. Rauber, Euless, TX (US); Mithat Yuce, Lantana, TX (US); Thomas C. Parham, Jr., Colleyville, TX (US); Thomas J. Newman, Midlothian, TX (US); Mark A. Wiinikka, Hurst, TX (US)

( * ) Notice: Subject to any disclaimer, the term of this patent is extended or adjusted under 35 U.S.C. 154(b) by 228 days.

(21) Appl. No.: 15/603,119

(22) Filed: May 23, 2017

(65) Prior Publication Data

US 2017/0253327 A1 Sep. 7, 2017

Related U.S. Application Data

(62) Division of application No. 14/283,515, filed on May 21, 2014, now Pat. No. 9,656,744.

(51) Int. Cl.

| | |
|---|---|
| ***B64C 27/54*** | (2006.01) |
| ***B64C 27/51*** | (2006.01) |
| ***F16C 11/06*** | (2006.01) |
| *B64C 27/635* | (2006.01) |
| *B64C 27/59* | (2006.01) |

(Continued)

(52) U.S. Cl.

CPC .............. *B64C 27/54* (2013.01); *B64C 27/51* (2013.01); *F16C 11/0695* (2013.01); *B64C 27/58* (2013.01); *B64C 27/59* (2013.01); *B64C 27/635* (2013.01); *F16C 11/045* (2013.01); *F16C 11/0614* (2013.01); *F16C 23/02* (2013.01); *F16C 2326/43* (2013.01)

(58) Field of Classification Search

CPC ......... B64C 27/54; B64C 27/51; B64C 27/58; B64C 27/59; B64C 27/635; F16C 11/095; F16C 11/045; F16C 11/0614; F16C 11/0695; F16C 23/02

USPC ....... 416/1, 140, 204 R, 103, 105, 106, 107, 416/149, 150, 162, 134 A

See application file for complete search history.

(56) References Cited

U.S. PATENT DOCUMENTS

| | | | |
|---|---|---|---|
| 2,950,767 | A | 8/1960 | Lemont, Jr. |
| 3,759,632 | A | 9/1973 | Rybicki |

(Continued)

FOREIGN PATENT DOCUMENTS

| | | |
|---|---|---|
| EP | 2803571 A1 | 11/2014 |
| GB | 2490781 | 11/2012 |

OTHER PUBLICATIONS

Extended European Search Report dated Sep. 25, 2015 from counterpart EP App. No. 15168540.1.

(Continued)

*Primary Examiner* — Kevin F Murphy
*Assistant Examiner* — Kelsey E Cary
(74) *Attorney, Agent, or Firm* — James E. Walton

(57) ABSTRACT

An aircraft includes a rotor blade and a rotor hub system. The rotor hub system includes a lead-lag damper having a rod end and being operably associated with the rotor blade; a blade adapter having a first arm and an opposing second arm; a pin carried by the blade adapter and configured to secure in position via the first arm and the second arm; and an actuator secured to the pin and configured to adjust the position of the lead-lag rod end relative to the first arm and the second arm.

18 Claims, 8 Drawing Sheets

301 307 107 309 317 314 D2 D1 315 313 D3 311 319 316 303 305

(51) Int. Cl.

| | |
|---|---|
| *B64C 27/58* | (2006.01) |
| *F16C 11/04* | (2006.01) |
| *F16C 23/02* | (2006.01) |

(56) References Cited

U.S. PATENT DOCUMENTS

| | | | | |
|---|---|---|---|---|
| 4,174,137 | A * | 11/1979 | Ferris | B64C 13/30 29/898.07 |
| 4,504,193 | A * | 3/1985 | Mouille | B64C 27/32 416/134 A |
| 4,738,592 | A | 4/1988 | Cavanaugh | |
| 4,915,585 | A | 4/1990 | Guimbal | |
| 2005/0196227 | A1* | 9/2005 | Mahy | F16C 11/0614 403/122 |
| 2007/0065284 | A1* | 3/2007 | Certain | B64C 27/322 416/134 A |
| 2008/0260456 | A1 | 10/2008 | Bouru | |
| 2011/0243734 | A1 | 10/2011 | Schmaling | |
| 2013/0114995 | A1* | 5/2013 | Godiot | F16C 11/0614 403/59 |
| 2013/0121827 | A1* | 5/2013 | Stamps | B64C 27/51 416/106 |
| 2013/0149023 | A1 | 6/2013 | Weicko et al. | |
| 2013/0241124 | A1 | 9/2013 | Bosworth | |

OTHER PUBLICATIONS

Examination Report dated Oct. 9, 2015 from counterpart EP App. No. 15168540.1.

* cited by examiner

ADJUSTABLE BLADE-TO-HUB LEAD-LAG DAMPER ATTACHMENT

BACKGROUND

1. Field of the Invention

The present application relates generally to dampers, and more specifically, to an adjustable lead-lag damper.

2. Description of Related Art

In articulated rotors, blade lead-lag, feathering and flapping motions will all potentially contribute to one-per-revolution damper motion, which affects hub and blade loads as well as damping of the lead-lag mode.

Helicopter with articulated rotors require the use of lead-lag damper to remain stable on the ground and in the air. However, in addition to providing damping to the rotor, lead-lag dampers will also generate loads, which are generally a function of the one-per-revolution damper motion (more motion, more load). Furthermore, it is known that one-per-revolution damper motion in conjunction with motion at the lag mode frequency, reduces the lead-lag damping of the rotor system (more motion, less damping). Therefore, minimizing one-per-revolution damper motion would be beneficial in terms of both reducing loads and increasing the dual frequency damping of the lead-lag mode.

This one-per-revolution damper displacement is essentially related to the rotor geometry (location of the blade pivot points and damper attachment points) and the blade lead-lag, feathering and flapping motions. In addition, the phase shift between these blade motions is important, as different phasing could result in either an additive or cancelling effect, increasing or reducing overall damper displacement.

Although the foregoing developments in the field of lead-lag dampers represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
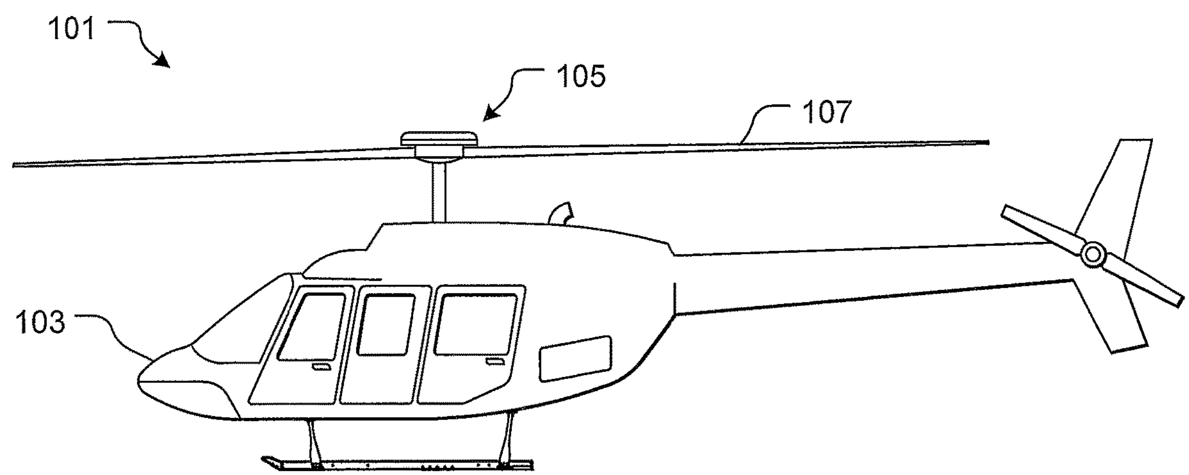
FIG. 1 is a side view of a helicopter according to a preferred embodiment of the present application.
Figure 2:
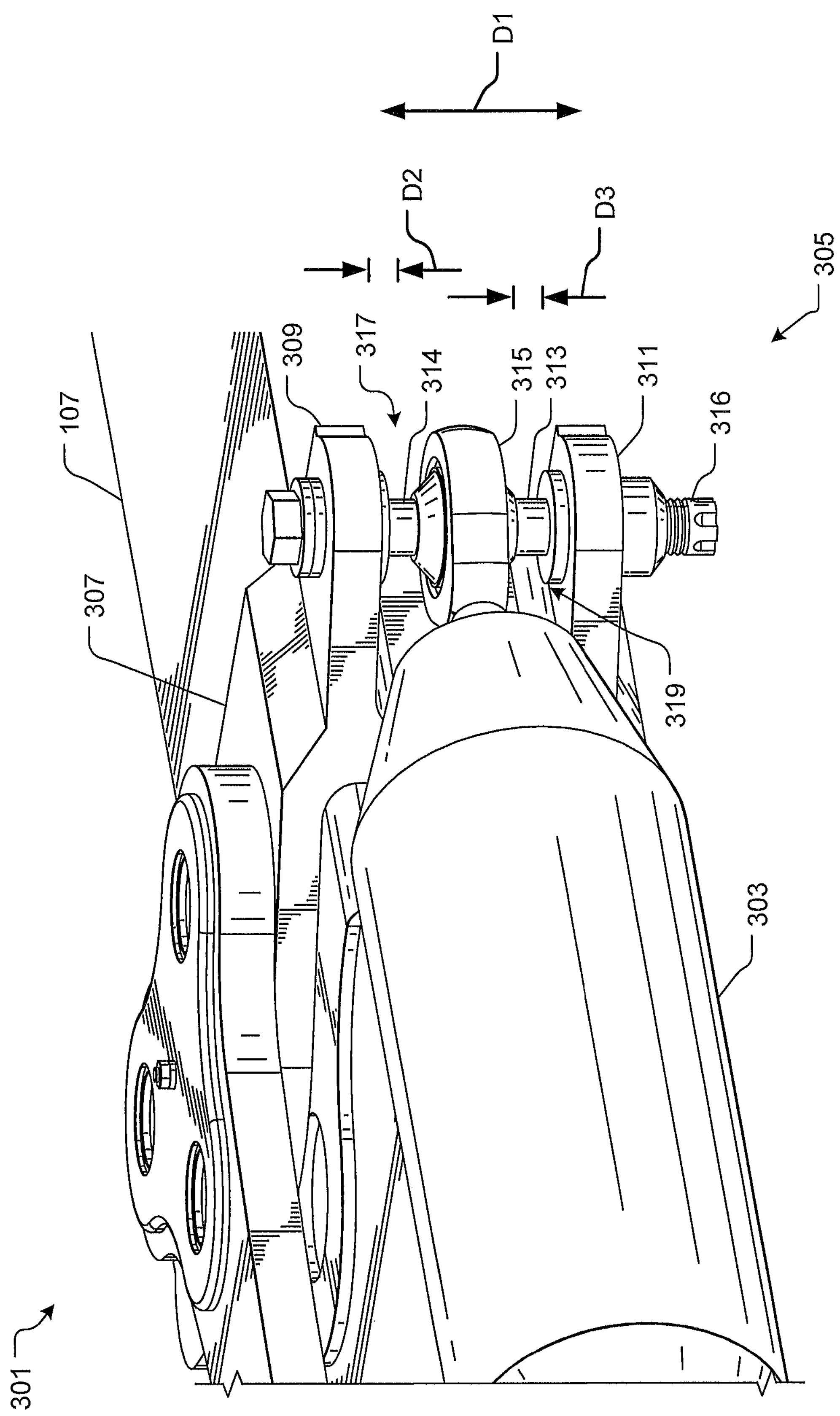
FIGS. 2-5 are perspective views of a rotor hub system in accordance with a preferred embodiment of the present application.
Figure 3:
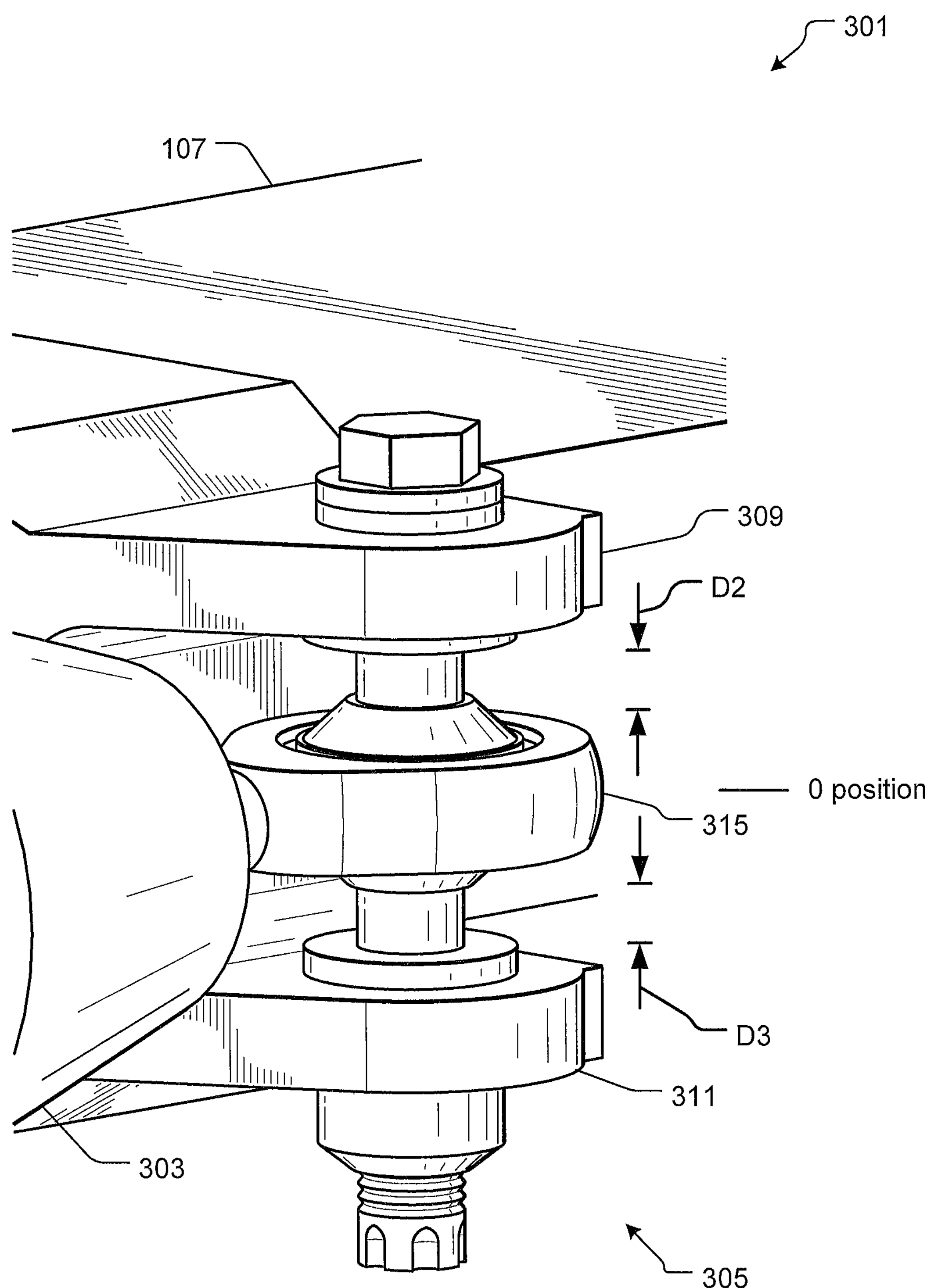

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system of the present application overcomes the abovementioned problems commonly associated with conventional articulated rotor hub assemblies. The system discussed herein provides a means of changing the phasing of the different contributions to damper displacement to minimize damper one-per-revolution motion. This is accomplished through an adjustable damper attachment to the hub and/or blade. The adjustability of the damper attachment points is what would allow the reduction in loads and the increase in dual frequency lead-lag damping. Such adjustability is provided by appropriate hardware added to the attachment locations. The adjustment could be purely mechanical, performed let's say before flight during the flight test program to identify the optimal configuration, or it could be part of an active system that allows adjustments to be performed in-flight. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 1 depicts an aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight. In the exemplary embodiment, only two blades 107 are shown; however, it will be appreciated the features of the system discussed herein are preferably operably associated with three or more blades with an articulated soft-in-plane rotor hub assembly.

Although shown associated with a helicopter, it will be appreciated that the system of the present application could also be utilized with different types of rotary aircraft having articulated soft-in-plane rotor hub assemblies.

FIGS. 2-5 depict various view of a rotor hub system 301 in accordance with a preferred embodiment of the present application. In the contemplated embodiment, system 301 overcomes one or more of the problems commonly associated with conventional articulated rotor hub assemblies. To achieve these features, system 301 includes a lead-lag damper 303 that is adjustable in height relative to a damper attachment joint 305. The selective placement of the lead-lag damper 303 relative to damper attachment joint 305 overcomes the problems discussed above with respect to conventional articulated rotor hub assemblies.

System 301 includes a blade adapter 307 having a first arm 309 and a second arm 311 configured to receive a pin 316, which in turn secures to a rod end 315. Rod end 315 is retained in position via a first spacer 313 and a second spacer 314 configured to receive the pin 316 therethrough. Thus, in the exemplary embodiment, arms 309, 311 along with pin 316 create damper attachment joint 305 that the lead-lag damper 303 is secured thereto via a spherical-bearing rod end 315.

One of the unique features believed characteristic of the present application is the selective adjustment of rod end 315 relative to arms 309, 311, as depicted with direction arrow D1. The gap 317 between first arm 309 and rod end 315 is represented by a distance D2, while the gap 319 between second arm 311 and rod end 315 is represented by a distance D3. In the exemplary embodiment, the distances D2 and D3 are equal to each other, thereby pacing the rod end at a neutral position. Movement of the rod end 315 changes the position to either positive or negative, as will be shown and discussed below.

Figure 4:
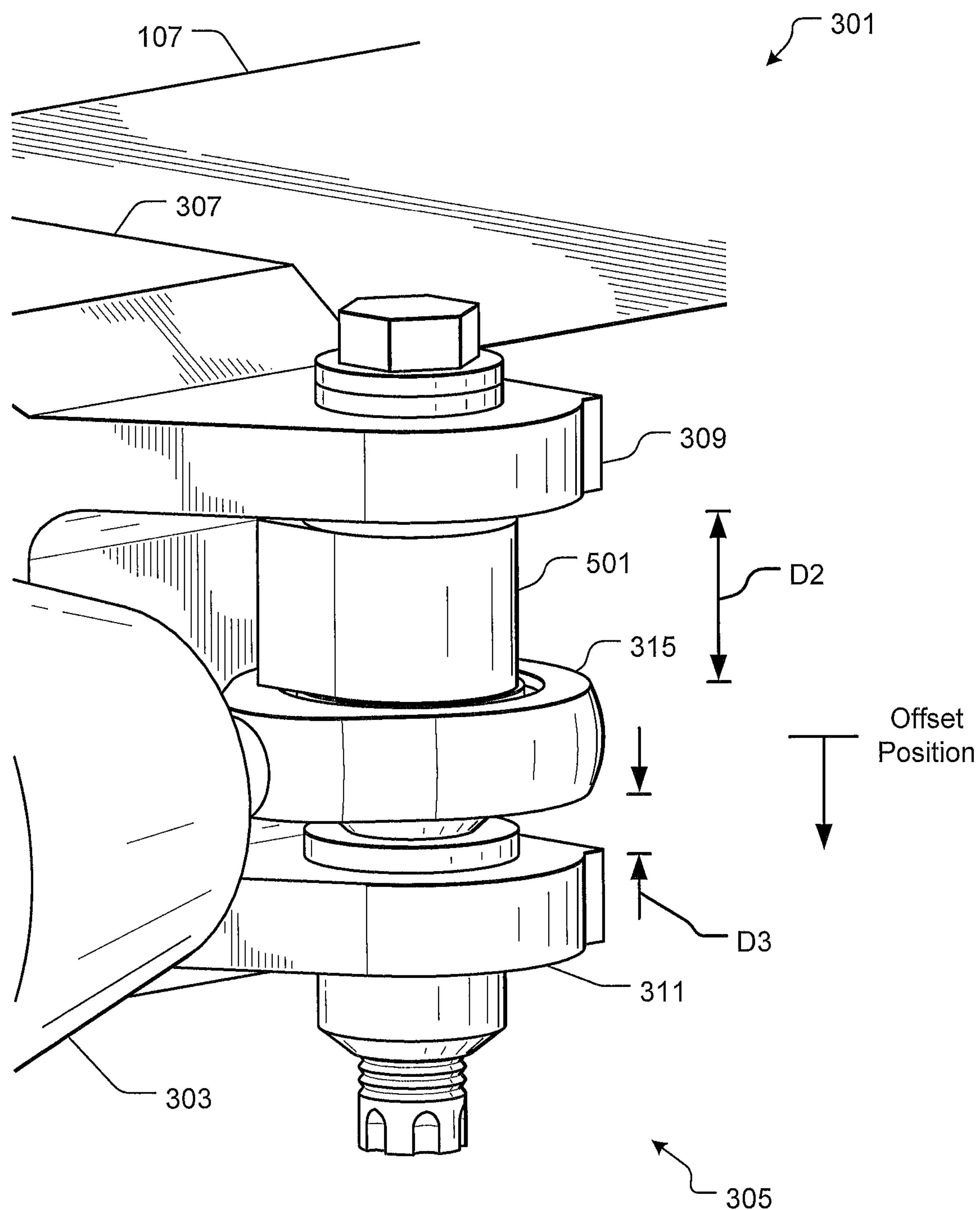
Figure 5:
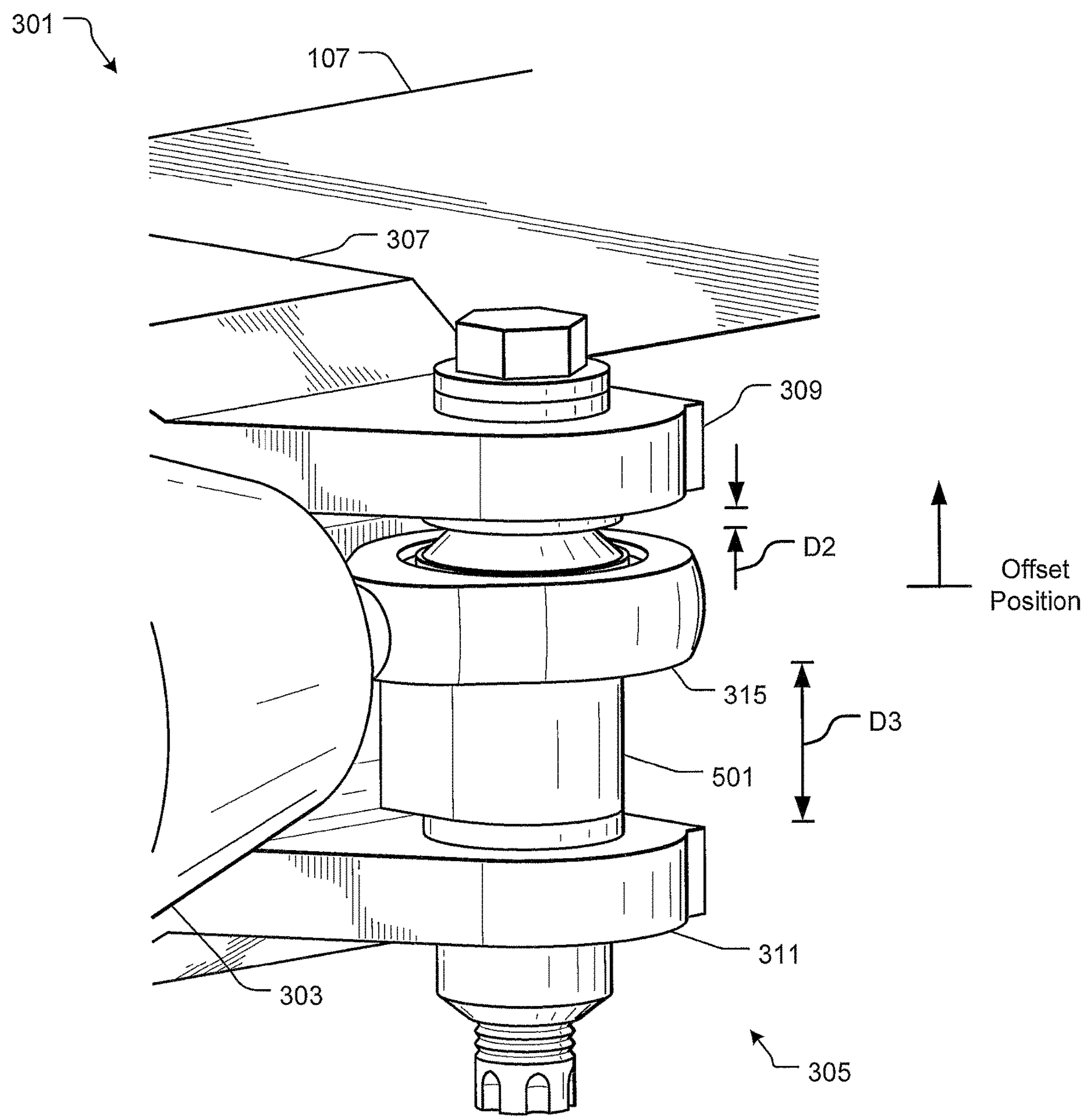

Referring specifically to FIGS. 4 and 5, system 301 is further provided with a spacer 501 configured to receive pin 316 and sit between the arms 309, 311 of the blade adapter and the rod end 315. In one contemplated embodiment, spacer 501 could include an aperture (not shown) extending through the longitudinal length of the spacer and configured to receive the pin 316 therethrough. Alternative embodiments could includes a spacer that is rigidly attached to the blade adapter 307 and/or removably secured to pin 316 for selective adjustment after use.

It will be appreciated that the spacer 501 is configured to retain rod end 315 in an offset position relative to arms 309, 311. Thus, in the exemplary embodiments of FIGS. 4 and 5, distances D2 and D3 are no longer equal to each other and the rod end 315 is considered to be in an offset position. In FIG. 4, the rod end 315 is considered in a negative offset position where distance D2 is greater than distance D3, while FIG. 5 shows rod end 315 in a positive offset position wherein distance D2 is less than distance D3.

It will be appreciated that the distances D2, D3 relative to each other is selectively tailored to achieve optimal flight performance. In the contemplated method of use, spacer longitudinal length is determined prior to flight testing. Thus, the spacer 501 does not allow for real-time adjustment of D2, D3 during flight.

Figure 6A:
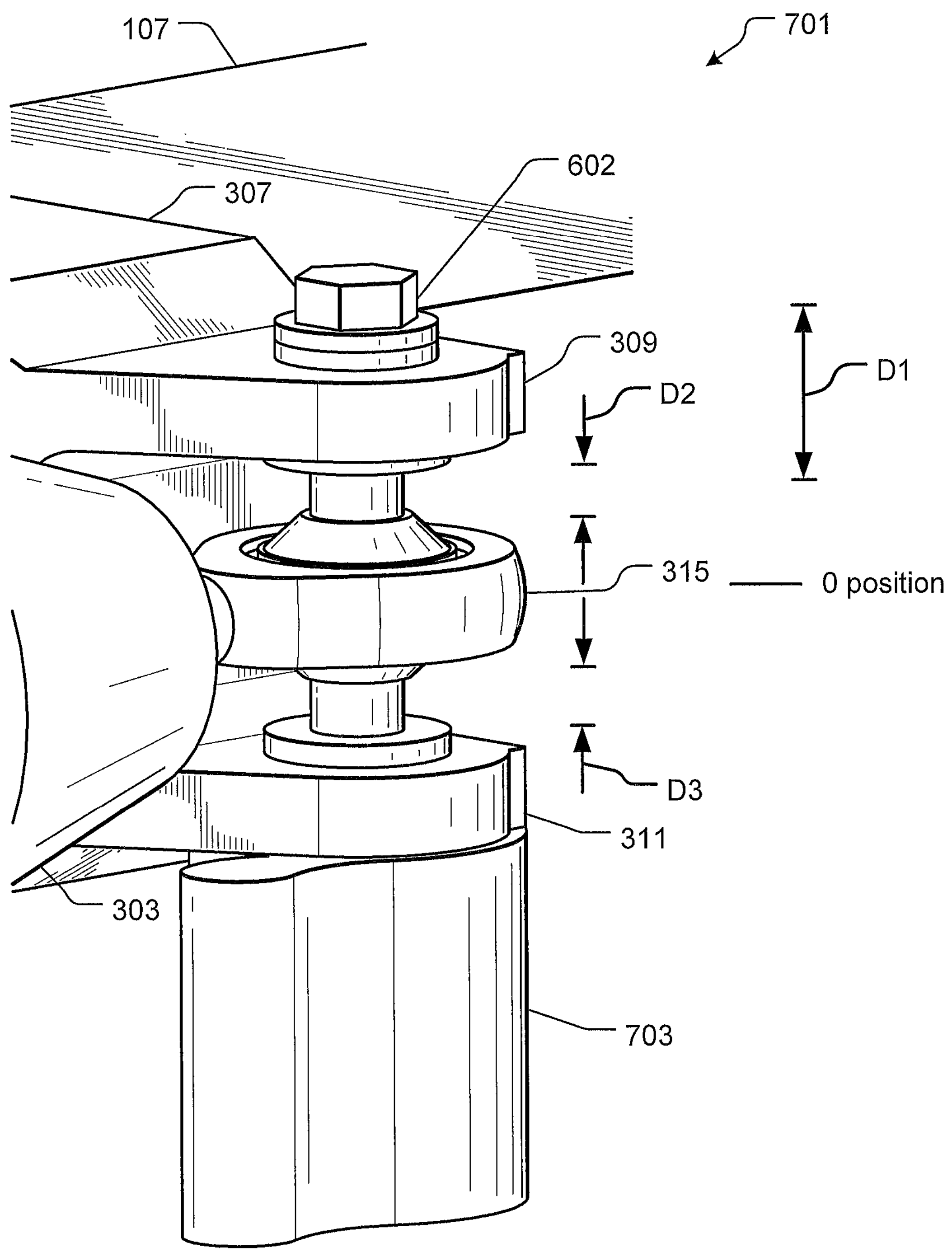
FIGS. 6A and 6B are perspective views of a rotor hub system in accordance with an alternative embodiment of the present application.
Figure 6B:
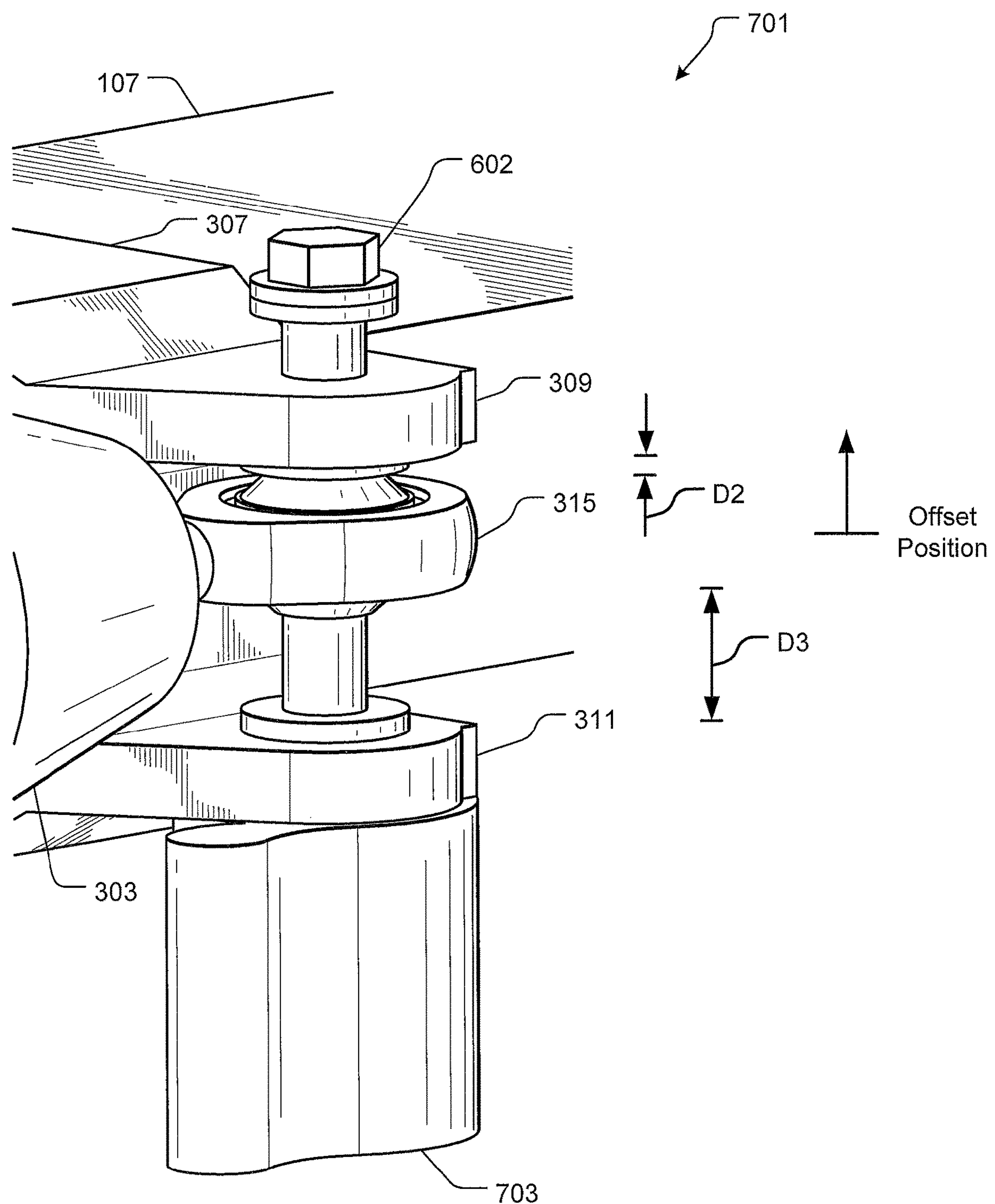

Another unique feature believed characteristic of the present application is the ability to selectively adjust distances D2, D3 while the aircraft is in flight. To achieve this feature, a system 701 includes an actuator 703 operably associated with a pin 602 and configured to move pin 602 in direction D1, as depicted in FIGS. 6A and 6B. The movement of pin 602 allows selective adjustment of D2 and D3 during flight. The control of actuator 703 can be achieved autonomously with a flight control computer (not shown) and/or manually. In the contemplated embodiment, pin 602 is a helical pin having threads for moving the rod end in direction D1. However, alternative embodiments could utilizes a telescoping pin and/or other suitable means to move rod end 315 in direction D1.

Figure 7:
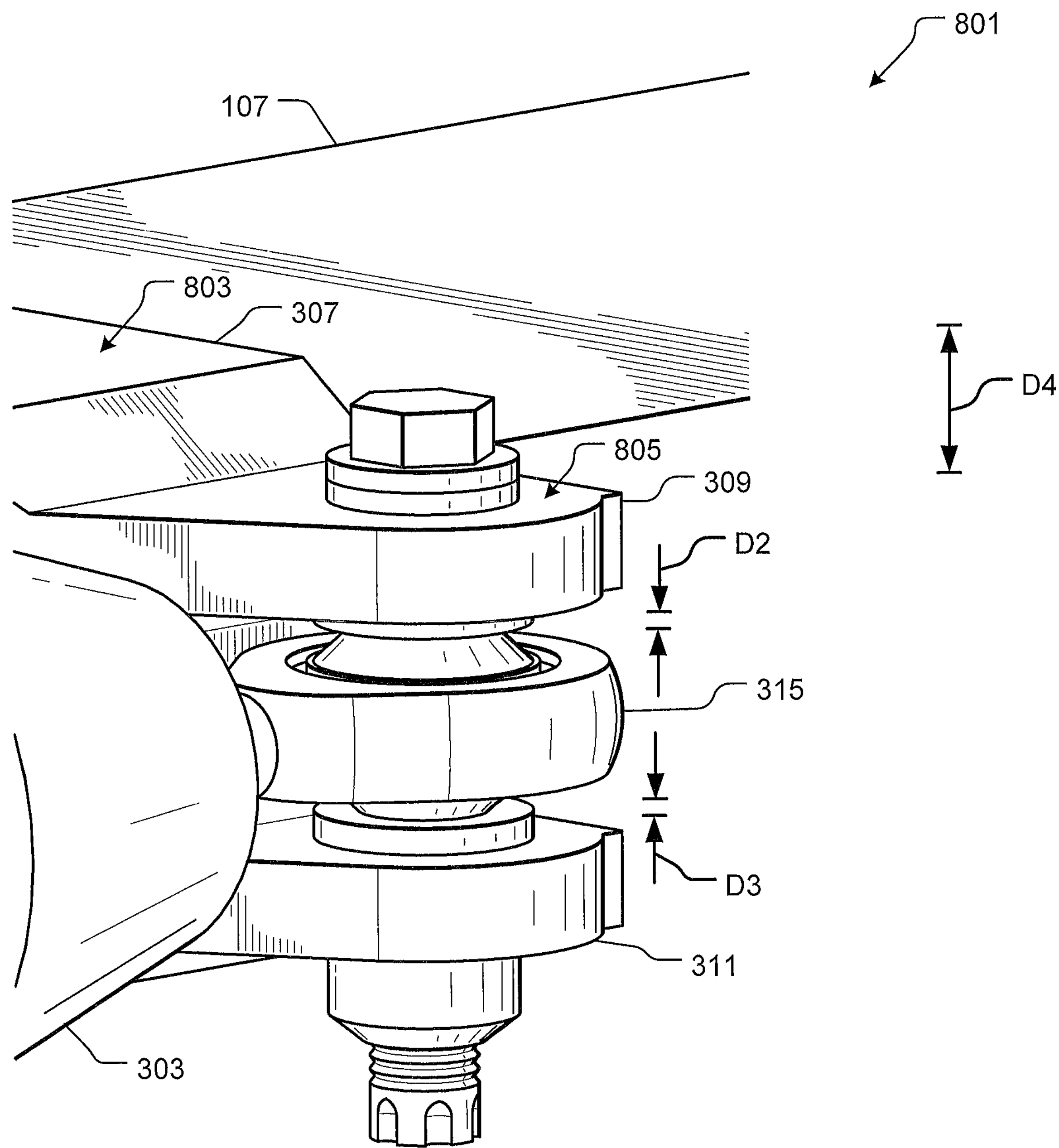
FIG. 7 is a perspective view of a rotor hub system in accordance with an alternative embodiment of the present application.

In FIG. 7, a perspective view of a system 801 is shown in accordance with an alternative embodiment of the present application. System 801 is substantially similar in function to system 301. However, system 801 is configured such that the arms 309, 311 are positioned such that no gap is formed between the arms and the rod end 315. To achieve this feature, arm 309 and/or arm 311 is adjusted relative to the blade adapter. Thus, the surface 803 of blade adapter 307 is spaced apart from surface 805 of first arm 309 at a distance D4 so as to create equal distances D2, D3 between the arms and the rod end.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotor hub system for an aircraft, comprising:

a lead-lag damper operably associated with a rotor blade of the aircraft;

a blade adapter, having:

a first arm and an opposing second arm;

a pin carried by the blade adapter and secured in position via the first arm and the second arm, the pin supporting a rod end of the lead-lag damper; and a first interchangeable spacer and a second interchangeable spacer, both spacers being configured to receive the pin therethrough and configured to retain the rod end of the lead-lag damper secured to the pin at a selected distance relative to the first arm and second arm;

wherein the pin is a telescoping pin; and wherein translation of the telescoping pin causes translation of the rod end between the first arm and the second arm.

2. The system of claim 1, wherein the first spacer and the second spacer each have a longitudinal length; and wherein the longitudinal length of the first spacer is less than the longitudinal length of the second spacer, thus retaining the rod end at a non-equal distance between the first arm and the second arm.

3. The system of claim 1, wherein the first spacer and the second spacer each have a longitudinal length; and wherein the longitudinal length of the first spacer is equal to the longitudinal length of the second spacer, thus retaining the rod end at an equal distance between the first arm and the second arm.

4. The system of claim 1, wherein the rotor hub system is an articulate rotor hub system.

5. The system of claim 4, wherein the articulated rotor hub system is a soft-in-plane assembly.

6. The system of claim 1, wherein the rotor hub system is operably associated with at least three rotor blades.

7. An aircraft, comprising:

a rotor blade; and a rotor hub system, having:

a lead-lag damper having a rod end and being operably associated with the rotor blade;

a blade adapter, having:

a first arm and an opposing second arm;

a pin carried by the blade adapter and secured in position via the first arm and the second arm, the pin supporting a rod end of the lead-lag damper;

an actuator secured to the pin and configured to adjust the position of the lead-lag rod end relative to the first arm and the second arm; and a first spacer and a second spacer, both spacers being configured to receive the pin therethrough and configured to retain the rod end of the lead-lag damper secured to the pin at a selected distance relative to the first arm and second arm.

8. The aircraft of claim 7, wherein the aircraft is a helicopter.

9. The aircraft of claim 7, wherein the rotor hub system is an articulate rotor hub system.

10. The aircraft of claim 9, wherein the articulated rotor hub system is a soft-in-plane assembly.

11. The aircraft of claim 7, wherein the rotor hub system is operably associated with at least three rotor blades.

12. The aircraft of claim 7, wherein the actuator is autonomously controlled.

13. A method to increase flight performance of an aircraft, comprising:

providing the aircraft of claim 7; and adjusting the position of the rod end relative to the first arm and the second arm via an actuator.

14. The method of claim 13, further comprising;

autonomously controlling the adjustment of the rod end.

15. The method of claim 13, wherein the pin is a threaded helical pin;

wherein the process of adjusting the position of the rod end is achieved via the threaded helical pin operably associated with the rod end of the actuator.

16. The method of claim 15, wherein the actuator rotates the helical threaded rod.

17. The method of claim 13, wherein the pin is a telescoping pin;

wherein the process of adjusting the position of the rod end is achieved via the telescoping pin operably associated with the rod end and the actuator.

18. The method of claim 17, wherein the actuator translates the telescoping pin.

* * * * *